(12) United States Patent
Karunakaran et al.

(10) Patent No.: US 11,307,848 B2
(45) Date of Patent: Apr. 19, 2022

(54) SYSTEM FOR ELECTRONIC INTEGRATION AND DEPLOYMENT OF COMPUTER CODE IN A CODE DEVELOPMENT NETWORK

(71) Applicant: Bank of America Corporation, Charlotte, NC (US)

(72) Inventors: Sibhi Arul Prian Poyhai Karunakaran, Tamil Nadu (IN); Maguluri Tanuja, Tamil Nadu (IN)

(73) Assignee: BANK OF AMERICA CORPORATION, Charlotte, NC (US)

(\*) Notice: Subject to any disclaimer, the term of this patent is extended or adjusted under 35 U.S.C. 154(b) by 290 days.

(21) Appl. No.: 16/458,413

(22) Filed: Jul. 1, 2019

(65) Prior Publication Data

US 2021/0004225 A1 Jan. 7, 2021

(51) Int. Cl.
  *G06F 8/71* (2018.01)
  *G06F 8/60* (2018.01)
  *G06F 16/27* (2019.01)
  *H04L 9/06* (2006.01)
  (Continued)

(52) U.S. Cl.
  CPC ........... *G06F 8/71* (2013.01); *G06F 8/60* (2013.01); *G06F 9/44552* (2013.01); *G06F 16/27* (2019.01); *H04L 9/0643* (2013.01); *H04L 9/3271* (2013.01); *H04L 2209/38* (2013.01)

(58) Field of Classification Search
  CPC . H04L 2209/38; H04L 9/0643; H04L 9/3247; H04L 9/3236; G06F 8/61; G06F 8/60; G06F 8/71; G06F 16/27; G06F 9/44552
  See application file for complete search history.

(56) References Cited

U.S. PATENT DOCUMENTS

| 7,949,992 B2 | 5/2011 | Andreev et al. |
| 8,245,192 B1 * | 8/2012 | Chen ............. G06F 8/71 717/122 |
| 8,626,887 B2 | 1/2014 | Andreev et al. |

(Continued)

OTHER PUBLICATIONS

Ulebyshev et al; Blockchain-based Software Development System for Untrusted Environments; 4 pages (Year: 2018).*

(Continued)

*Primary Examiner* — Wei Y Zhen
*Assistant Examiner* — Brahim Bourzik
(74) *Attorney, Agent, or Firm* — Moore & Van Allen PLLC; Seongun M. Hong

(57) ABSTRACT

A system provides electronic integration and deployment of computer code in a code development network. The system may comprise a multilayered distributed ledger structure and may perform real-time source code conflict checks by combining the latest nonce from a primary distributed ledger with the genesis block of a working distributed ledger into a hash algorithm. Depending on whether the output of said hash algorithm satisfies the cryptographic challenge set by the distributed ledger system, the system may be able to detect mismatches between the source code found in a working distributed ledger and the source code found in the primary distributed ledger. Furthermore, the system may include production systems as nodes of the primary distributed ledger such that the production systems may maintain updated copies of the source code throughout the software development process.

17 Claims, 7 Drawing Sheets

(51) Int. Cl.
*G06F 9/445* (2018.01)
*H04L 9/32* (2006.01)

(56) References Cited

U.S. PATENT DOCUMENTS

| | | | |
|---|---|---|---|
| 8,683,430 B2 | 3/2014 | Gonzales et al. | |
| 8,775,476 B2 | 7/2014 | Henderson | |
| 8,812,654 B2 | 8/2014 | Gelvin et al. | |
| 8,875,091 B1 | 10/2014 | Rouleau et al. | |
| 8,943,493 B2 | 1/2015 | Schneider | |
| 8,959,220 B2 | 2/2015 | Frey et al. | |
| 8,972,538 B2 | 3/2015 | Adlung et al. | |
| 8,984,115 B2 | 3/2015 | Baitinger et al. | |
| 9,081,613 B2 | 7/2015 | Bieswanger et al. | |
| 9,405,523 B2 | 8/2016 | Choi et al. | |
| 9,557,968 B1 | 1/2017 | Smith et al. | |
| 9,672,031 B2 | 6/2017 | Agrawal | |
| 9,830,248 B2 | 11/2017 | Potti et al. | |
| 9,983,860 B1 | 5/2018 | Koty et al. | |
| 10,108,533 B1 | 10/2018 | Parasuraman et al. | |
| 10,120,917 B2 | 11/2018 | Kothari et al. | |
| 10,152,265 B1 | 12/2018 | Tomayko et al. | |
| 10,175,975 B2 | 1/2019 | Kolesnik et al. | |
| 10,365,922 B1* | 7/2019 | Wang | G06F 21/10 |
| 2015/0332283 A1* | 11/2015 | Witchey | G06Q 10/10 705/3 |
| 2017/0031676 A1* | 2/2017 | Cecchetti | G06F 8/65 |
| 2017/0134246 A1 | 5/2017 | Amendjian et al. | |
| 2017/0214696 A1 | 7/2017 | Cleaver et al. | |
| 2018/0260212 A1* | 9/2018 | Wisnovsky | G06F 8/71 |
| 2018/0293363 A1* | 10/2018 | Asati | G06F 21/64 |
| 2019/0349190 A1* | 11/2019 | Smith | H04L 61/2069 |
| 2019/0384594 A1* | 12/2019 | Michiyama | G06F 8/71 |
| 2020/0019706 A1* | 1/2020 | Zhu | G06F 8/71 |
| 2020/0082302 A1* | 3/2020 | Zoldi | G06N 5/02 |
| 2020/0133658 A1* | 4/2020 | Agrawal | G06F 8/36 |
| 2020/0159927 A1* | 5/2020 | Herrin | G06F 8/71 |
| 2020/0186607 A1* | 6/2020 | Murphy | H04W 4/24 |
| 2021/0256113 A1* | 8/2021 | Stott | H04L 9/3247 |

OTHER PUBLICATIONS

Kim et al ; A Study of Blockchain based on Graph Database for Software Quality Measurement Integrity (Year: 2018).*

* cited by examiner

SYSTEM FOR ELECTRONIC INTEGRATION AND DEPLOYMENT OF COMPUTER CODE IN A CODE DEVELOPMENT NETWORK

FIELD OF THE INVENTION

The present disclosure embraces a system for electronic integration and deployment of computer code in a code development network. In particular, the system may perform real-time source code conflict checks and provide synchronization between a source code repository and production system.

BACKGROUND

Conventional systems and repositories pose a number of technological challenges in the area of software development. For instance, over the course of development, a developer's working copy of the code may become desynchronized with the latest copy of the code as found in a source code repository. Furthermore, conventional repositories may be susceptible to a single point of failure. Accordingly, there is a need for efficient and more secure way to provide synchronization of code within the computing environment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for electronic integration and deployment of computer code in a code development network. The system may comprise a multilayered distributed ledger structure and may perform real-time source code conflict checks by combining the latest nonce from a primary distributed ledger with the genesis block of a working distributed ledger into a hash algorithm. Depending on whether the output of said hash algorithm satisfies the cryptographic challenge set by the distributed ledger system, the system may be able to detect mismatches between the source code found in a working distributed ledger and the source code found in the primary distributed ledger. Furthermore, the system may include production systems as nodes of the primary distributed ledger such that the production systems may maintain updated copies of the source code throughout the software development process.

Accordingly, embodiments of the present disclosure provide a system for electronic integration and deployment of computer code in a code development network. The system may comprise a memory device with computer-readable program code stored thereon; a communication device; and a processing device operatively coupled to the memory device and the communication device. The processing device may be configured to execute the computer-readable program code to retrieve, from a primary distributed ledger, a latest version of computer code; generate, from the latest version of the computer code, a working distributed ledger comprising a working genesis block, wherein the working genesis block is a copy of a last block within the primary distributed ledger at a first point in time; submit a proposed block to the working distributed ledger, wherein the proposed block comprises one or more commits to the computer code; execute a computer code conflict check by comparing the primary distributed ledger with the working distributed ledger; and validate the proposed block via a consensus algorithm.

In some embodiments, the processing device is further configured to submit the proposed block to the primary distributed ledger; execute a second computer code conflict check; validate the proposed block via the consensus algorithm; and validate the proposed block via a second consensus algorithm.

In some embodiments, the computer code conflict check comprises causing the processing device to retrieve a nonce value from the last block within the primary distributed ledger at the first point in time; and combine the nonce value with a block header of the working genesis block into a hash algorithm to generate a hash output.

In some embodiments, the computer code conflict check further causes the processing device to detect that the nonce value is below a predetermined threshold; based on detecting that the nonce value is below the predetermined threshold, determine that a cryptographic challenge has been satisfied; and determine that the computer code conflict check has been successfully completed.

In some embodiments, the computer code conflict check further causes the processing device to detect that the nonce value is above a predetermined threshold; based on detecting that the nonce value is above the predetermined threshold, determine that a cryptographic challenge has not been satisfied; and determine that the computer code conflict check has failed.

In some embodiments, the processing device is further configured to detect that the computer code conflict check has been successfully completed; and based on detecting that the computer code conflict check has been successfully completed, determine that the working distributed ledger is up to date.

In some embodiments, the processing device is further configured to detect that the computer code conflict check has failed; retrieve, from a primary distributed ledger, a refreshed version of the computer code; and generate, from the refreshed version of the computer code, a working distributed ledger comprising a refreshed genesis block, wherein the refreshed genesis block is a copy of a last block within the primary distributed ledger at a second point in time, wherein the second point in time occurs after the first point in time.

In some embodiments, the processing device is further configured to generate and transmit a notification to a developer, wherein the notification indicates that the working distributed ledger needs to be refreshed.

In some embodiments, the consensus algorithm is a proof of authority algorithm, wherein the second consensus algorithm is a proof of work algorithm.

In some embodiments, the processing device is further configured to detect that the proposed block has been successfully validated via the consensus algorithm; and append the proposed block to the working distributed ledger.

In some embodiments, the processing device is further configured to detect that the proposed block has been successfully validated via the consensus algorithm and the second consensus algorithm; and append the proposed block to the primary distributed ledger.

Embodiments of the present disclosure also provide a computer program product for electronic integration and deployment of computer code in a code development network. The computer program product may comprise at least one non-transitory computer readable medium having computer-readable program code portions embodied therein, where the computer-readable program code portions comprise executable code portions for retrieving, from a primary distributed ledger, a latest version of computer code; generating, from the latest version of the computer code, a working distributed ledger comprising a working genesis block, wherein the working genesis block is a copy of a last block within the primary distributed ledger at a first point in time; submitting a proposed block to the working distributed ledger, wherein the proposed block comprises one or more commits to the computer code; executing a computer code conflict check by comparing the primary distributed ledger with the working distributed ledger; and validating the proposed block via a consensus algorithm.

In some embodiments, the computer-readable program code portions further comprise executable code portions for submitting the proposed block to the primary distributed ledger; executing a second computer code conflict check; validating the proposed block via the consensus algorithm; and validating the proposed block via a second consensus algorithm.

In some embodiments, the computer code conflict check comprises retrieving a nonce value from the last block within the primary distributed ledger at the first point in time; and combining the nonce value with a block header of the working genesis block into a hash algorithm to generate a hash output.

In some embodiments, the computer code conflict check further comprises detecting that the nonce value is below a predetermined threshold; based on detecting that the nonce value is below the predetermined threshold, determining that a cryptographic challenge has been satisfied; and determining that the computer code conflict check has been successfully completed.

Embodiments of the present disclosure also provide a computer-implemented method for electronic integration and deployment of computer code in a code development network. The method may comprise retrieving, from a primary distributed ledger, a latest version of computer code; generating, from the latest version of the computer code, a working distributed ledger comprising a working genesis block, wherein the working genesis block is a copy of a last block within the primary distributed ledger at a first point in time; submitting a proposed block to the working distributed ledger, wherein the proposed block comprises one or more commits to the computer code; executing a computer code conflict check by comparing the primary distributed ledger with the working distributed ledger; and validating the proposed block via a consensus algorithm.

In some embodiments, the method further comprises submitting the proposed block to the primary distributed ledger; executing a second computer code conflict check; validating the proposed block via the consensus algorithm; and validating the proposed block via a second consensus algorithm.

In some embodiments, the computer code conflict check comprises retrieving a nonce value from the last block within the primary distributed ledger at the first point in time; and combining the nonce value with a block header of the working genesis block into a hash algorithm to generate a hash output.

In some embodiments, the computer code conflict check further comprises detecting that the nonce value is below a predetermined threshold; based on detecting that the nonce value is below the predetermined threshold, determining that a cryptographic challenge has been satisfied; and determining that the computer code conflict check has been successfully completed.

In some embodiments, the computer code conflict check further comprises detecting that the nonce value is above a predetermined threshold; based on detecting that the nonce value is above the predetermined threshold, determining that a cryptographic challenge has not been satisfied; and determining that the computer code conflict check has failed.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
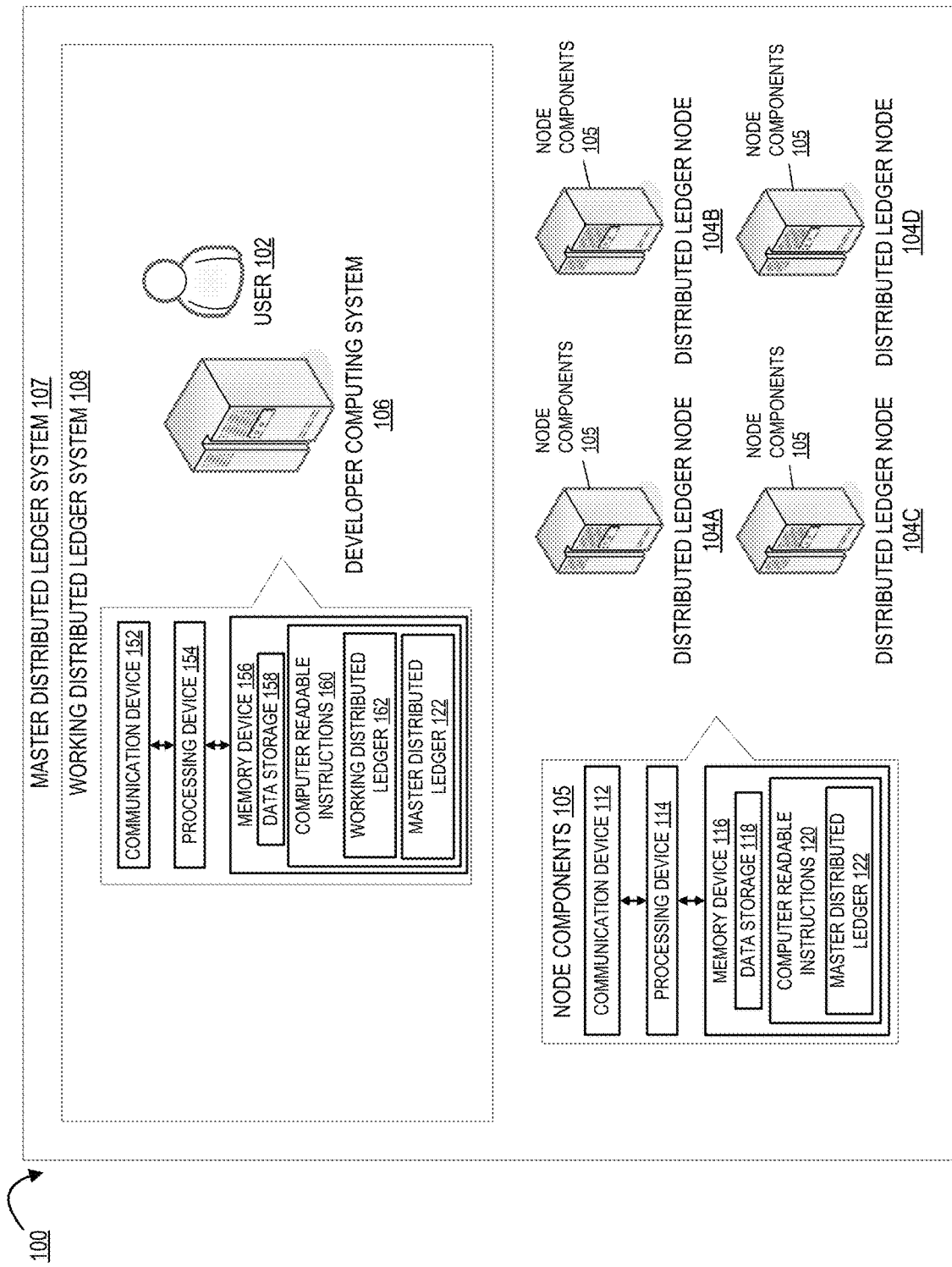
Figure 2:
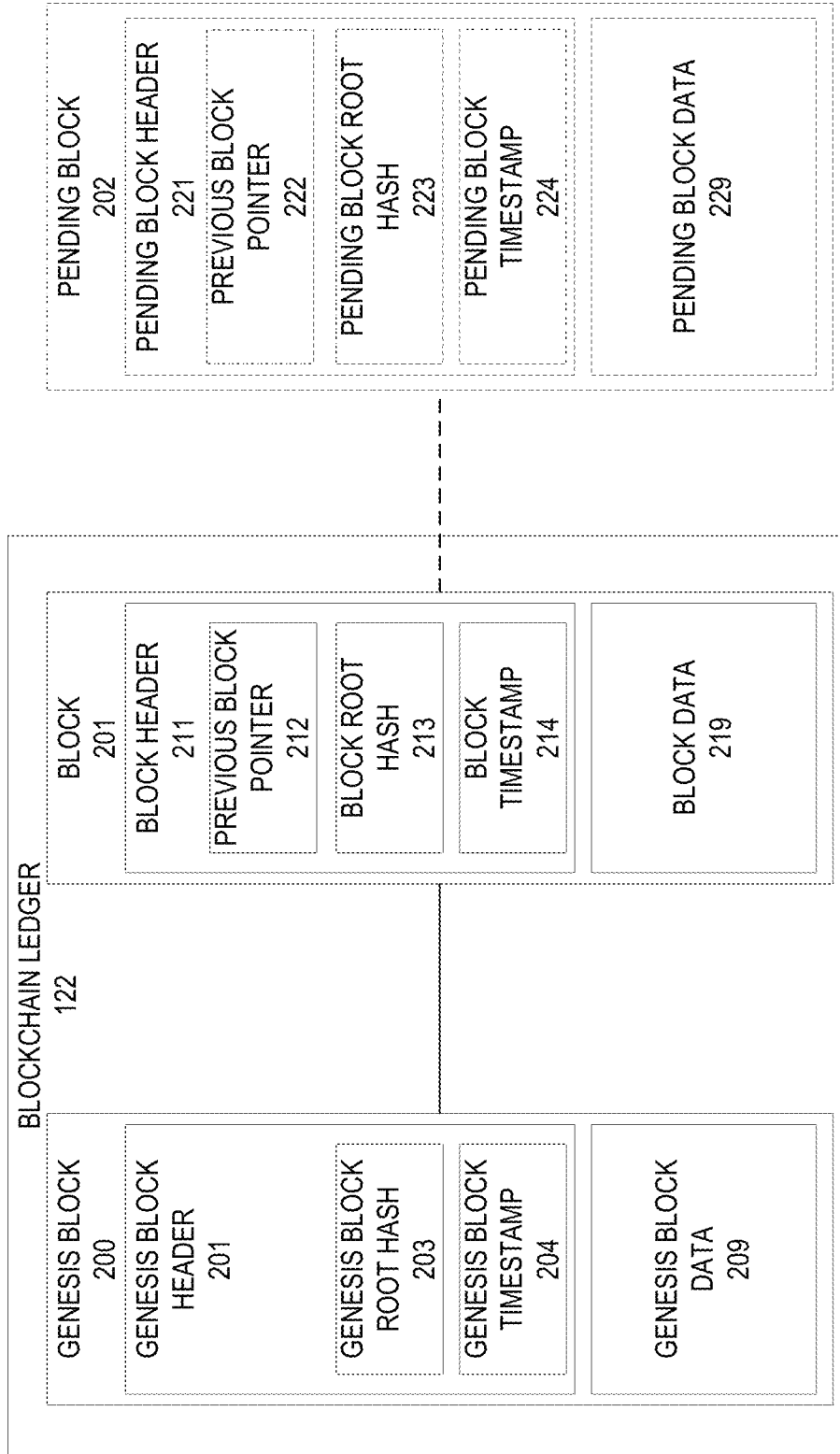
Figure 3A:
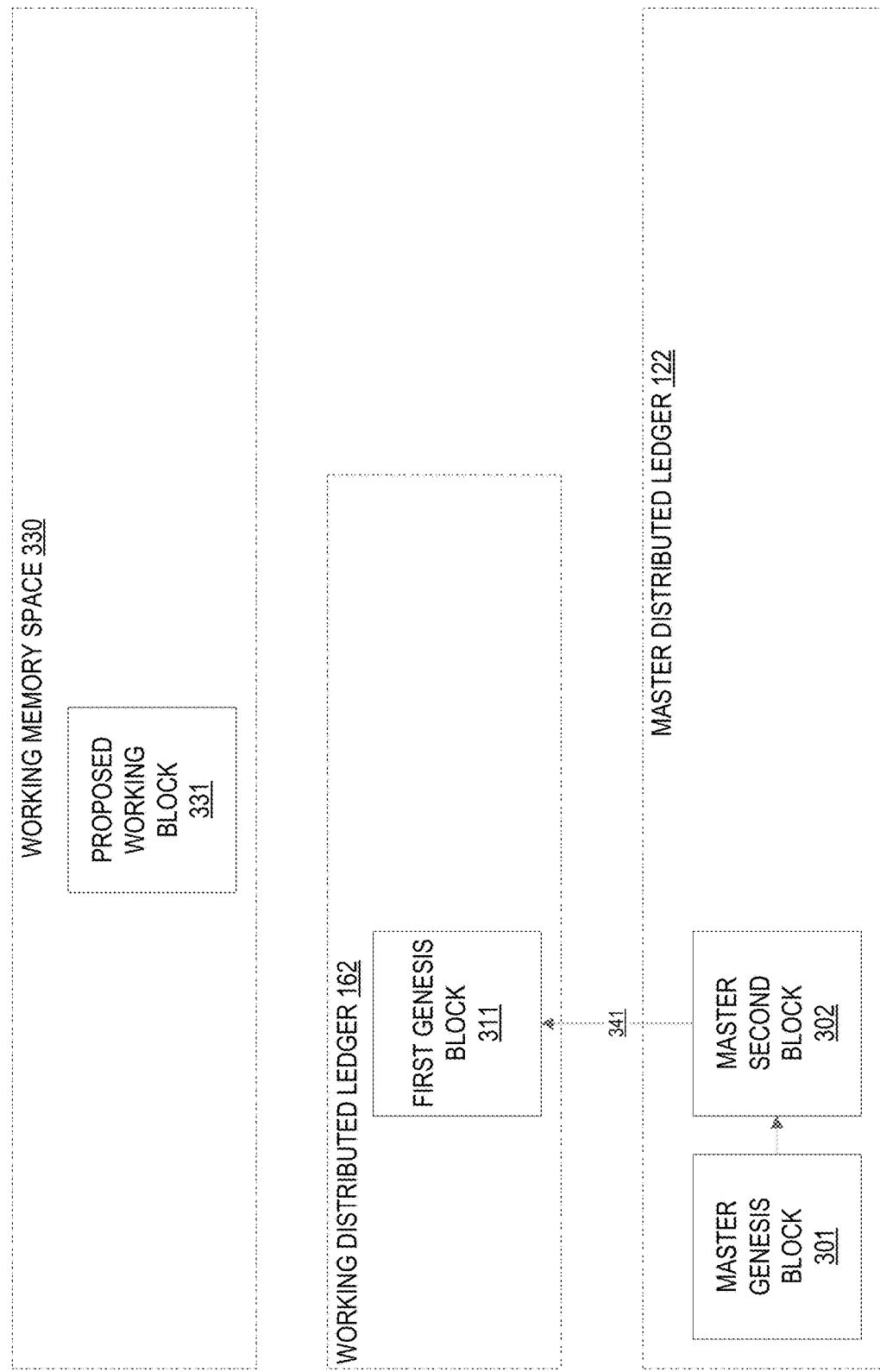
Figure 3B:
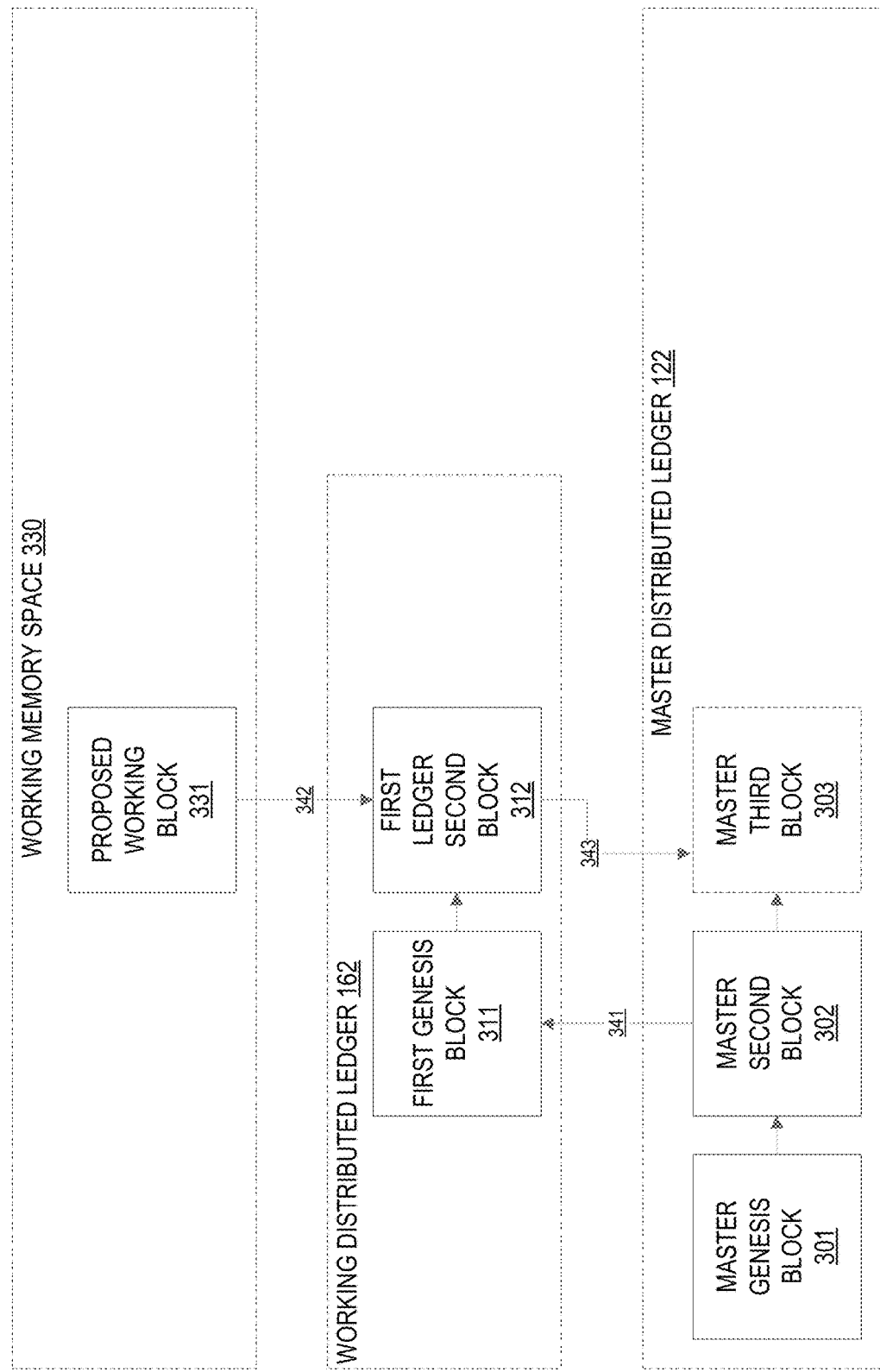
Figure 3C:
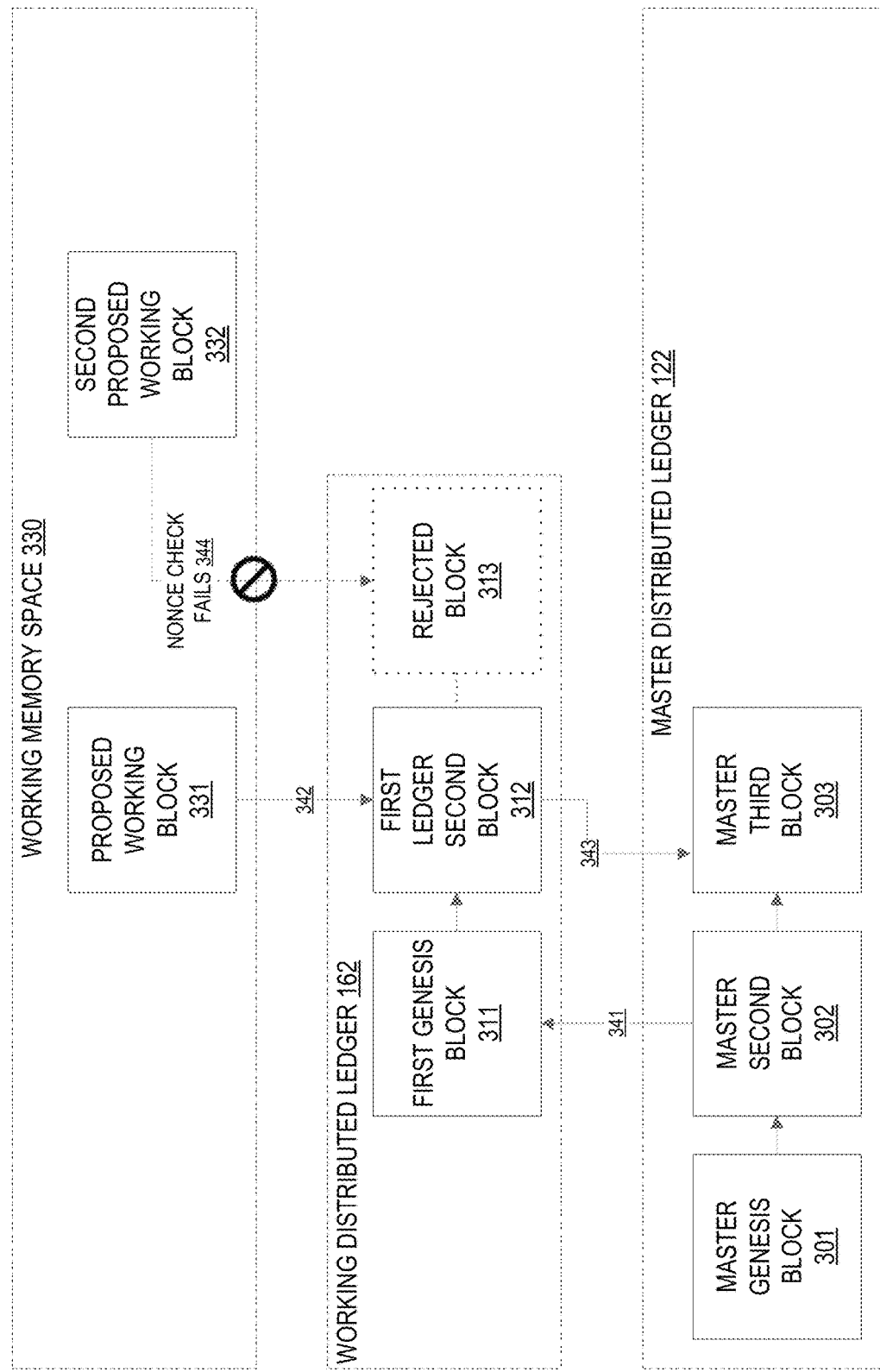
Figure 3D:
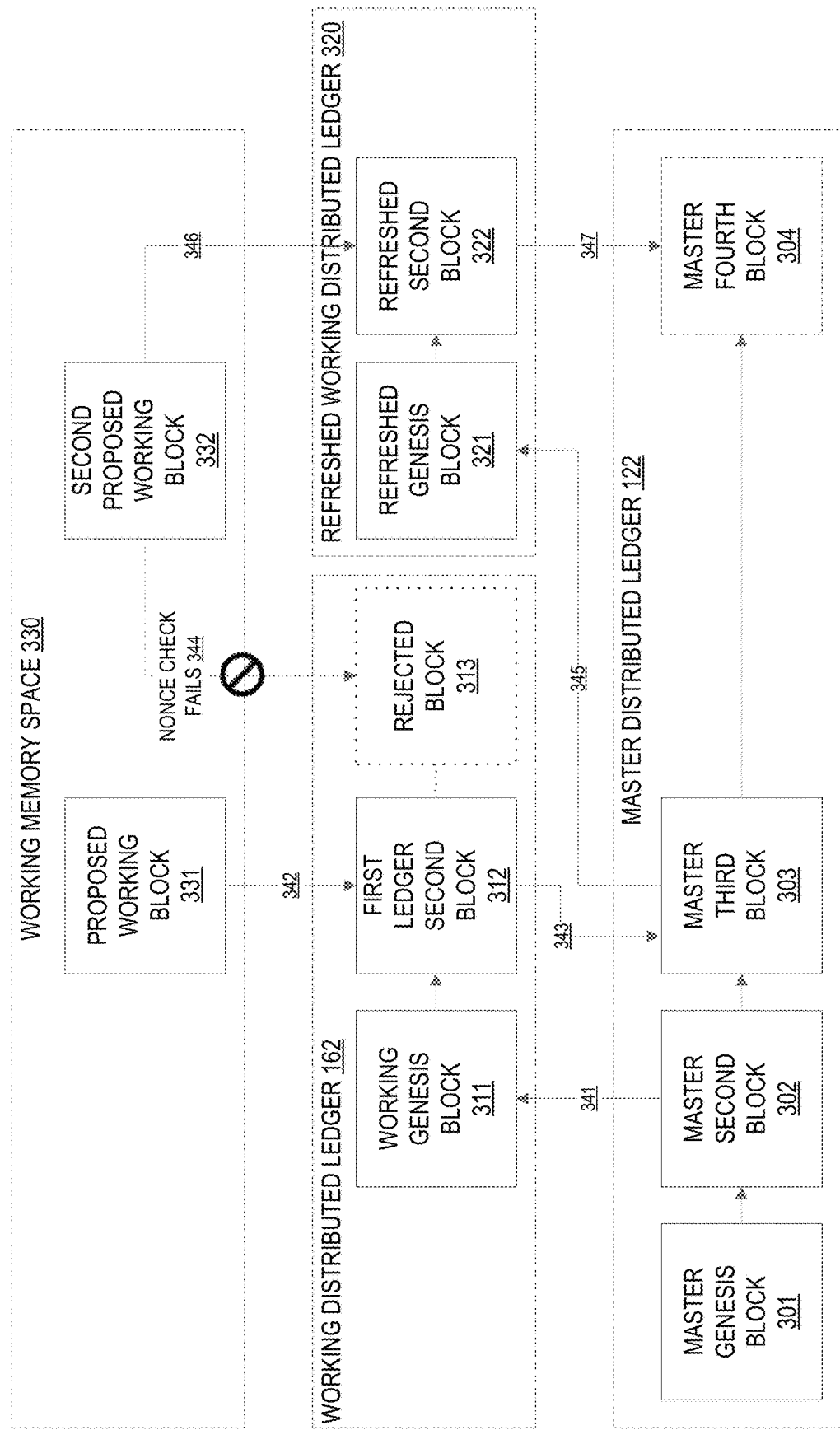
Figure 4:
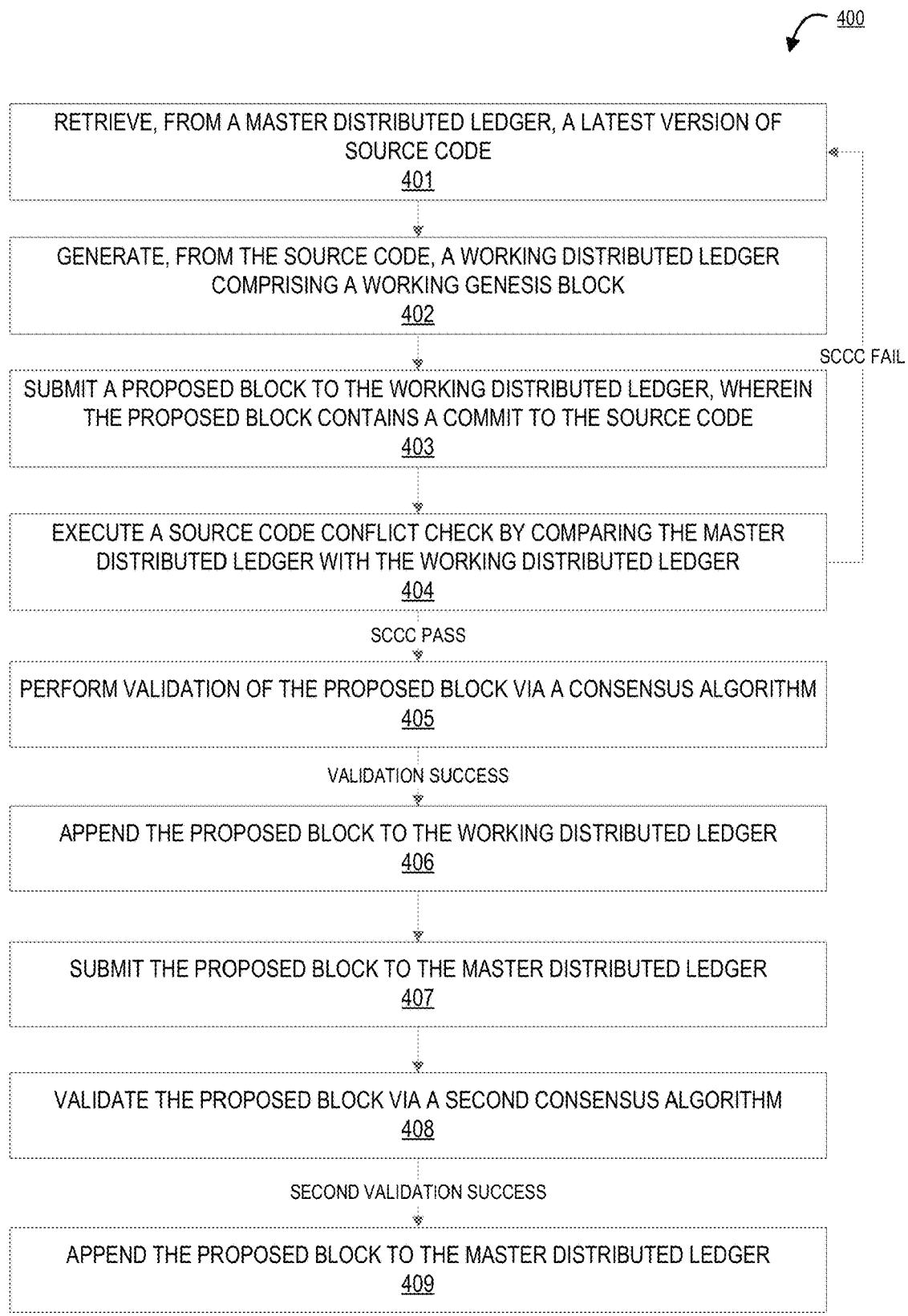

Having thus described embodiments of the invention in general terms, reference will now be made to the accompanying drawings, wherein:

FIG. 1 illustrates an operating environment for the code integration and deployment system, in accordance with one embodiment of the present disclosure;

FIG. 2 is a block diagram illustrating the data structures within an exemplary blockchain distributed ledger, in accordance with one embodiment of the present disclosure;

FIG. 3A illustrates the state of a code integration and deployment system at a time in which a developer has been assigned to develop an application, in accordance with one embodiment of the present disclosure;

FIG. 3B illustrates a state of the code integration and deployment system in which the developer has submitted a commit to be incorporated into the primary source code within the primary distributed ledger, in accordance with one embodiment of the present disclosure;

FIG. 3C illustrates a state of the code integration and deployment system in which the copy of the working source code within the working distributed ledger is mismatched with the latest version of the primary source code as found in the primary distributed ledger, in accordance with one embodiment of the present disclosure;

FIG. 3D illustrates a state of the code integration and deployment system in which working copies of the source code are updated based on the primary distributed ledger, in accordance with one embodiment of the present disclosure; and FIG. 4 illustrates a process flow or performing code integration using a multilayered distributed ledger, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed ledger," or "distributed electronic ledger" as used herein may refer to a structured list of data records that is decentralized and distributed amongst a plurality of computing systems and/or devices. In some embodiments, the distributed ledger may be a blockchain ledger.

"Blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the blockchain. In this way, beginning from an originating block (e.g., a "genesis block"), each block in the blockchain is linked to another block via the pointers within the block headers. If the data or metadata within a particular block in the blockchain becomes corrupted or modified, the hash values found in the header of the affected block and/or the downstream blocks may become mismatched, thus allowing the system to detect that the data has been corrupted or modified.

A "blockchain ledger" may refer to a distributed ledger which uses blockchain data structures. Generally, a blockchain ledger is an "append only" ledger in which the data within each block within the blockchain may not be modified after the block is added to the blockchain; data may only be added in a new block to the end of the blockchain. In this way, the blockchain may provide a practically immutable ledger of data records over time.

"Permissioned blockchain" as used herein may refer to a blockchain ledger for which an access control mechanism is implemented such that only known, authorized users may take certain actions with respect to the blockchain ledger (e.g., add new data records, participate in the consensus mechanism, or the like). Accordingly, "unpermissioned blockchain" as used herein may refer to a blockchain ledger without an access control mechanism.

"Private blockchain" as used herein may refer to a blockchain ledger accessible only to users or devices that meet specific criteria (e.g., authorized users or devices of a certain entity or other organization). Accordingly, a "public blockchain" is a blockchain ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid blockchain such that certain nodes may store certain segments of the blockchain but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

Embodiments of the present disclosure provide a system for continuous integration and deployment using one or more electronic distributed ledger (e.g., blockchain ledgers). The system may comprise a primary distributed ledger which comprises a primary version of source code (which also may be referred to herein as "computer code") for a software application in development. Accordingly, the primary distributed ledger may comprise a source code repository which contains the primary version of the source code. In addition to the primary distributed ledger, the system may further comprise one or more working distributed ledgers which may comprise working copies of the source code. In this regard, each developer may perform work (e.g., edits, revisions, deletions, or the like) on an individualized working distributed ledger which contains a working copy of the source code which is specific to the developer. Working distributed ledgers may be generated on a rolling, as-needed basis based on the latest version of the source code within the primary distributed ledger at the time of the working distributed ledger's creation (e.g., the genesis block of a working distributed ledger may be created using the latest block of the primary distributed ledger). Each developer may then commit the changes from the working distributed ledger to the primary distributed ledger. Once the nodes of the primary distributed ledger validate the commits using a consensus algorithm, the commits may be appended to the primary distributed ledger.

In situations in which multiple developers perform work on the source code, certain working distributed ledgers may contain working copies of the source code that no longer reflect the latest version of the source code as found in the primary distributed ledger. In an exemplary embodiment, the system may generate a first working distributed ledger and a second working distributed ledger to be exclusively accessed by a first developer and a second developer respectively. The first working distributed ledger may comprise a first genesis block and the second working distributed ledger may comprise a second genesis block, where the first genesis block and second genesis block are copies of the latest block in the primary distributed ledger. At some point in development, the first developer may, based on the changes made to the working copy of the source code within the first working distributed ledger, commit the changes to the primary distributed ledger. Once the changes are accepted and appended to the primary distributed ledger, the second developer is no longer working on the latest version of the source code (e.g., the working copy of the source code within the second working distributed ledger is outdated).

Accordingly, the system may perform real-time source code (or computer code) conflict checks ("SCCC" or "SC³") to maintain synchronization between working copies of the source code stored within working distributed ledgers and the primary copy of the source code stored within the primary distributed ledger. In particular, the system may, at set intervals (e.g., every 30 seconds, every 5 minutes, every hour, or the like), retrieve the nonce value from the latest block in the primary distributed ledger. The system may then input both the latest nonce value and the genesis block of the working distributed ledger into a hash algorithm to determine whether the output satisfies the cryptographic challenge set by the system. For instance, the cryptographic challenge may require the output of the hash algorithm to have a value less than a certain threshold based on a difficulty level set by the system (e.g., if the difficulty level is two, the first two digits of the output of the hash algorithm must both be zeroes). If, during an SCCC on a particular working distributed ledger, the system detects that the output of the hash algorithm does not satisfy the cryptographic challenge, then the system may detect a mismatch between said working distributed ledger and the primary distributed ledger. In this way, the system may ensure that both the system and developers become aware of divergences in source code versions on a rolling basis.

The system may further provide for synchronization of production systems (e.g., systems that have been deployed in the production environment) with the source code repository. In this regard, the production systems may be included as a node of the primary distributed ledger (e.g., the production system may host a full copy of the primary distributed ledger and participate in consensus with respect to the primary distributed ledger's contents). In this way, the processes run by the production systems may be scheduled based on the latest version of the application's source code.

The system as described herein confers a number of technological advantages over conventional methods of source code management and application development. For instance, by performing source code conflict checks as described herein, the system may ensure that working copies of the source code may be synchronized with the primary copy of the source code in real time or near real time. Furthermore, by adding the production system as a node for the primary distributed ledger, the system may help prevent de-synchronization of software code between the production system and the source code repository.

Turning now to the figures, FIG. 1 illustrates an operating environment 100 for the code integration and deployment system, in accordance with one embodiment of the present disclosure. In particular, FIG. 1 illustrates a developer computing system 106 that is operatively coupled, via a network, to one or more blockchain nodes 104A, 104B, 104C, 104D. The developer computing system 106 and the distributed ledger nodes 104A, 104B, 104C, and 104D may be part of a primary distributed ledger system 107. In some embodiments, the developer computing system 106 may further be a part of a working distributed ledger system 108. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, although FIG. 1 depicts four distributed ledger nodes 104A, 104B, 104C, 104D, the system may alternatively comprise fewer or more distributed ledger nodes. Furthermore, a single system, device, or server as depicted in FIG. 1 may represent multiple systems, devices, or servers. For instance, though FIG. 1 depicts a single developer computing system 106, the system may comprise multiple developer computing systems which may each host individual working distributed ledgers.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the primary distributed ledger system 107 may comprise a plurality of computing systems (e.g., the distributed ledger nodes 104A, 104B, 104C, 104D) which are owned and/or operated by the entity for the purposes of serving as a primary source code repository. In this regard, each of the distributed ledger nodes 104A, 104B, 104C, 104D may be, for example, a networked terminal, server, desktop computer, or the like, though it is within the scope of the disclosure for a distributed ledger node 104A, 104B, 104C, 104D to be a portable device such as a cellular phone, smart phone, smart device, personal data assistant (PDA), laptop, or the like. Each of the distributed ledger nodes 104A, 104B, 104C, 104D generally comprises a set of node components 105, which in turn comprises a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WiFi or Ethernet adapter, radio transceiver, or other device for communicating with other devices on the network.

The memory device 116 comprises computer-readable instructions 120 and data storage 118, which in one embodiment includes the computer-readable instructions 120 of a primary distributed ledger 122. The primary distributed ledger 122 may comprise a series of data records relevant to the objectives of the entity. For instance, the primary distributed ledger 122 may comprise a series of data records which make up the primary copy of the source code for an application in development. Each blockchain node 104A, 104B, 104C, 104D maintains its separate copy of the primary distributed ledger 122, where the contents of each copy of the primary distributed ledger 122 are determined via a consensus algorithm, as will be described further below.

Multiple different types of computing system may service as one of the distributed ledger nodes 104A, 104B, 104C, 104D. For instance, computing systems used by developers (e.g., the developer computing system 106) or testers/reviewers of the application in development may serve as nodes for the primary distributed ledger 122. In some embodiments, preproduction and/or production system may also serve as nodes of the primary distributed ledger 122. In this way, the primary source code may be distributed across various systems related to the application and/or the application development process, thereby ensuring that all related systems may access the latest version of the source code.

As illustrated in FIG. 1, the developer computing system 106 may comprise a communication device 152, a processing device 154, and a memory device 156. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the entity computing system 103 may also include a communication interface device that may be connected by a hardwire connection to the resource distribution device. The interface device may comprise a connector such as a USB, SATA, PATA, SAS or other data connector for transmitting data to and from the respective computing system.

The processing device 154 is operatively coupled to the communication device 152 and the memory device 156. The processing device 154 uses the communication device 152 to communicate with the network and other devices on the network, such as, but not limited to the blockchain node 104 and/or the entity computing system 103. The communication device 152 generally comprises a modem, antennae, WiFi or Ethernet adapter, radio transceiver, or other device for communicating with other devices on the network.

In some embodiments, the developer computing system 106 may be operated by a user 102. In some embodiments, the user 102 may be a software developer who uses the developer computing system 106 to contribute to the source code of the application stored within the primary distributed ledger 122. In this regard, the memory device 156 may have computer-readable instructions 160 stored thereon, which in one embodiment includes the computer-readable instructions 160 of a copy of the primary distributed ledger 122 and a working distributed ledger 162. In some embodiments, the memory device 156 may further include data storage 158 for storing data related to the system environment. The working distributed ledger 162 may be constructed based on at least a portion of the copy of the primary distributed ledger 122 stored on the developer computing system 106, as will be described in further detail below. In other embodiments, the user 102 may be another individual who is involved in the development of the application, such as a tester, reviewer, administrator, or the like.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary blockchain distributed ledger, in accordance with some embodiments. It should be noted that while the following description refers to the primary distributed ledger 122, the description may also apply to the working distributed ledger 162 or any other distributed ledger as described herein. With that said, FIG. 2 depicts a plurality of blocks 200, 201 within the primary distributed ledger 122, in addition to a proposed block 302 that has been submitted to be appended to the primary distributed ledger 122. The primary distributed ledger 122 may comprise a genesis block 200 that serves as the first block and origin for subsequent blocks in the primary distributed ledger 122. The genesis block 200, like all other blocks within the primary distributed ledger 122, comprise a block header 201 and block data 209. The genesis block data 209, or any other instances of block data within the primary distributed ledger 122 (or any other distributed ledger) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 610 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the primary distributed ledger 122. In some embodiments, the timestamp may be a Unix timestamp. In some embodiments, particularly in blockchains utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the blockchain. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (i.e., the genesis block 200) in the primary distributed ledger 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the chance of improper alteration of data records.

A pending block 202 or "proposed block" may be submitted for addition to the primary distributed ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the primary distributed ledger 122. A pending block timestamp 224 may also be added to signify the time at which the pending block 202 is added to the primary distributed ledger 122. In other embodiments, the consensus mechanism may be based on a total number of consensus inputs submitted by the nodes of the primary distributed ledger 122, e.g., a PBFT consensus mechanism. Once a threshold number of consensus inputs to validate the pending block 202 has been reached, the pending block 202 may be appended to the primary distributed ledger 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes).

FIG. 3A, FIG. 3B, FIG. 3C, and FIG. 3D illustrate the architecture and logical structures for the code integration and deployment system at various stages within the application development process, in accordance with one embodiment of the present disclosure. Specifically, FIG. 3A illustrates the state of the code integration and deployment system at the time in which a developer has been assigned to develop an application. In such an embodiment, the system may comprise a primary distributed ledger 122 comprising a plurality of blocks. In particular, as depicted in FIG. 3A, an exemplary primary distributed ledger 122 may comprise a primary genesis block 301 and primary second block 302. As described above, the primary distributed ledger 122 may host the primary copy of the source code for an application in development. Accordingly, the blocks 301, 302, within the primary distributed ledger 122 may contain the source code within their data portions. In one embodiment, the primary genesis block 301 may contain the original version of the source code. Accordingly, each subsequent block appended to the primary distributed ledger 122 (e.g., the primary second block 302) may comprise changes made to the source code (e.g., each block may include commits to the source code that have been submitted by the developers of the application). In some embodiments, subsequent blocks are added to the primary distributed ledger 122 via a PoW consensus algorithm. Accordingly, the computing system which submits a request to modify the source code (e.g., the developer computing system) may be required to computationally solve a cryptographic challenge (e.g., calculate a nonce value which satisfies the difficulty level set by the system). The difficulty level may be dynamically adjusted by the system to obtain a desired solution rate (e.g., the challenge is solved in 2 minutes on average).

The system may further comprise one or more working distributed ledgers 162, where a working distributed ledger 162 may be generated for each individual contributing to the development of the application. Typically, the working distributed ledger 162 includes the latest copy of the source code as it exists within the primary distributed ledger 122 at the time that the working distributed ledger 162 is created (e.g., a developer has been assigned to work on the application). In this regard, the system may generate a working genesis block 311 for the working distributed ledger 162 from the latest block of the primary distributed ledger 122 at the time of creation of the working distributed ledger 162 (e.g., the primary second block 302 as seen in FIG. 3A). The working genesis block 311 may be an exact copy of the latest block such that the working genesis block 311 may contain an up-to-date working copy of the source code to be edited by the developer. In this regard, the system may further comprise a working memory space 330 for each developer working on the application. The working memory space 330 serves as a temporary memory store for changes made by the developer to the working copy of the source code as stored in the working distributed ledger 162. Once the developer is ready to submit a commit of the developer's code to the primary source code, the developer's edits and changes may be compiled into a proposed working block to be submitted to the working distributed ledger 162.

At designated intervals (e.g., every 5 minutes, every minute, every 10 seconds, in real-time, or the like) and/or for certain actions taken within the system (e.g., submitting proposed working blocks to the working distributed ledger 162, submitting a block from the working distributed ledger 162 to the primary distributed ledger 122, or the like), the system may perform a source code conflict check ("SCCC") by comparing the copy of the source code within the working distributed ledger 162 with the primary copy of the source code within the primary distributed ledger 122. In this way, the system may be able to detect when a working copy of the source code has become outdated (e.g., the primary copy of the source code has been modified since the developer has begun work on the application).

A description of the SCCC process follows. As described above, blocks may be appended to the primary distributed ledger 122 using a PoW algorithm. Accordingly, the block header for each block within the primary distributed ledger 122 may contain a nonce value that, when combined with the other items within the block header, satisfies the cryptographic puzzle set by the system. To perform the SCCC, the system may read the latest nonce value within the primary distributed ledger 122 (e.g., the nonce value within the block header of the latest block within the primary distributed ledger 122, or primary second block 302 in the current example) and combine the nonce value with the block header of the genesis block 311 of the working distributed ledger 162 into a hash algorithm to produce a SCCC hash output. Based on the SCCC hash output, the system may be able to determine whether there is a disparity between the source code within the working distributed ledger 162 and the primary source code within the primary distributed ledger 122, as will be described in further detail below.

FIG. 3B represents a state of the code integration and deployment system in which the developer has submitted a commit to be incorporated into the primary source code within the primary distributed ledger 122. As shown by arrow 342, the developer may submit a proposed working block 331 (which may contain the commits submitted by the developer) to be appended to the working distributed ledger 162. At this stage, the system may perform an SCCC as described above by combining the nonce of the latest block in the primary distributed ledger 122 at the time in which the SCCC is performed (e.g., the nonce within the primary second block 302) with the header of the working genesis block 311 into a hash algorithm. In this scenario, the SCCC hash output will satisfy the cryptographic challenge because that the working genesis block 311 is a copy of the primary second block 302, which is currently the latest block within the primary distributed ledger 122. Accordingly, the system may determine through the SCCC that there have been no changes made to the primary source code, and thus the developer is currently working with the latest copy of the source code as it exists within the working genesis block 311 (e.g., the working source code has passed the SCCC).

In some embodiments, the system may also condition the addition of blocks to the working distributed ledger 162 on validation via a PoA consensus algorithm. In particular, the system may verify the identity of the submitter of the proposed working block 331 (e.g., identify the developer as an authorized individual). Upon verifying the identity (and associated reputation) of the submitter and determining that the working source code has passed the SCCC, the system may validate the proposed working block 331 to be added to the working distributed ledger 162 as a working second block 312.

Once the working second block 312 has been appended to the working distributed ledger 162, the working second block 312 may be submitted for addition to the primary distributed ledger 122, as shown by arrow 343. At this stage, the system may once again perform an SCCC and validation via PoA. Once the SCCC and validation by PoA have been completed, the system may begin a PoW mining process in which the submitting computing system (e.g., the developer computing system) hashes the header of the proposed block (e.g., the working second block 312) with incremented nonce values until the nonce value which satisfies the cryptographic challenge is found. Once said nonce value has been found, the nonce value may be included in the header of the proposed block and added to the primary distributed ledger 122 (e.g., as primary third block 303). At this stage, primary third block 303 represents the latest block in the primary distributed ledger 122.

FIG. 3C illustrates a state of the code integration and deployment system in which the copy of the working source code within the working distributed ledger 162 is mismatched with the latest version of the primary source code as found in the primary distributed ledger 122. In one embodiment, the developer may attempt to submit a second set of commits via a second proposed working block 332. In other embodiments, the second proposed working block 332 may represents a set of commits submitted by a second, independent developer. As shown by arrow 344, the system may perform an SCCC and PoA validation check on the second proposed working block 332 by combining the latest nonce value (from the primary third block 303) with the block header of the working genesis block 311 of the working distributed ledger 162. However, because the working genesis block 311 is a copy of the primary second block 302 and the latest nonce value was taken from the primary third block 303, the SCCC hash output will no longer satisfy the cryptographic challenge set by the system, which causes the SCCC to fail. Upon detecting that the SCCC has failed, the system may in turn detect a mismatch between the source code within the working distributed ledger 162 and the primary source code within the primary distributed ledger 122. At this stage, the system may reject the addition of the second proposed working block 332 to the working distributed ledger 162, as shown by the rejected block 313. The system may also notify the developer (and/or other parties such as an administrator, tester, reviewer, or the like) that the SCCC has failed and that the working copies of the source code should be updated. The system may further perform an update of the working copies of the source code as will be described in further detail below.

FIG. 3D illustrates a state of the code integration and deployment system in which working copies of the source code are updated based on the primary distributed ledger 122. In particular, upon detecting the need to update working copies of the source code on one or more developer computing systems (e.g., via an SCCC failure), the system may generate a refreshed working distributed ledger 320 comprising a second genesis block 321, where the second genesis block 321 is a copy of the latest block in the primary distributed ledger 122 at the time of creation of the refreshed working distributed ledger 320 (e.g., the primary third block 303). Accordingly, the refreshed working distributed ledger 320 in this example now contains the latest version of the source code (e.g., a "refreshed" version of the source code). The developer may then submit the second proposed working block 332, which contains the developer's commits (and changes to account for the new version of the source code), to be appended to the refreshed working distributed ledger 320. At this stage, the system may perform an SCCC and PoA validation process. In this scenario, hashing the latest nonce value (e.g., the nonce from the block header of the primary third block 303) and the block header of the second genesis block 321 (which is a copy of the primary third block 303) will generate a hash output which satisfies the cryptographic challenge. Once the SCCC and PoA validation have been completed, the second proposed working block 332 may be appended to the refreshed working distributed ledger 320 as the refreshed second block 322, as shown by arrow 346.

The refreshed second block 322 may then be submitted to be appended to the primary distributed ledger 122. Once again, the system may perform an SCCC and PoA validation with respect to the refreshed second block 322. Upon successful completion of the SCCC and PoA validation, the submitting computing system (e.g., the developer computing system) may begin calculating a nonce value to satisfy the cryptographic challenge as required by the PoW consensus algorithm. Upon successful calculation of the nonce value, the nonce value may be included in the header of the refreshed second block 322, after which the refreshed second block 322 may be appended to the primary distributed ledger 122 as the primary fourth block 304, as shown by arrow 347. In this manner, the system may ensure that the various working copies of the source code remain synchronized with the primary version of the source code.

FIG. 4 illustrates a process flow 400 for performing code integration using a multilayered distributed ledger, in accordance with one embodiment of the present disclosure. The process begins at block 401, where the system retrieves, from a primary distributed ledger, a latest version of source code for an application in development. In one embodiment, the source code may be retrieved by a computing system of an individual who is related to the development of the application (e.g., a software developer). In embodiments in which the primary distributed ledger is a blockchain ledger, the latest version of the source code may be stored in the block data of the primary distributed ledger (e.g., the latest block in the primary distributed ledger). The source code, when retrieved from the primary distributed ledger, may contain code written in a readable programming language such as C, C++, C#, Java, Python, or the like.

The process continues to block 402, where the system generates, from the source code, a working distributed ledger comprising a working genesis block. The working genesis block may contain the latest version of the source code as stored within the primary distributed ledger at the time of creation of the working genesis block. Accordingly, the working genesis block may be a copy of the latest block of the primary distributed ledger. Once the working genesis block is created, the developer may begin to create edits or changes to the source code within the working genesis block (e.g., the "working source code"). In some embodiments, the working source code may be copied to a working memory space (e.g., stored in a memory such as RAM, hard disk, SSD, flash drive, or the like) such that the developer may read and write to the working source code.

The process continues to block 403, where the system submits a proposed block to the working distributed ledger, wherein the proposed block contains a commit to the source code. The "commit" may comprise one or more changes or edits to the working source code made by the developer within the application development process. Accordingly, the commit may represent a developer's contributions to be incorporated into the primary copy of the source code.

The process continues to block 404, where the system executes a source code conflict check by comparing the primary distributed ledger with the working distributed ledger. The system may perform an SCCC whenever a proposed data record is submitted to a distributed ledger (e.g., the primary distributed ledger and/or a working distributed ledger) and/or at defined intervals, as described above. To check whether the commits refer to the latest version of the source code, the SCCC may be executed by combining the nonce value from the latest block in the primary distributed ledger with the header of the genesis block of the working distributed ledger into a hash algorithm (e.g., SHA, MD5, or the like) to produce a hash output (e.g., an SCCC hash output). If the SCCC hash output, which may be a fixed length character string, satisfies the cryptographic challenge (e.g., a requirement that a hash value begins with a specified number of zeroes), then the system may determine that the working source code matches the primary source code (e.g., the working source code is the latest version of the code). If, on the other hand, a mismatch is detected, then the system may determine that the working source code is out of date. In such a scenario, the process may loop back to block 401 to provide the developer with the latest version of the source code (e.g., by creating a new working distributed ledger using the latest block from the primary distributed ledger).

If the working distributed ledger has passed the SCCC, the process continues to block 405, where the system performs validation of the proposed block via a consensus algorithm. In some embodiments, the consensus algorithm may be a PoA algorithm which validates proposed data records based on the identity and/or reputation of the submitter. Accordingly, the system may verify the identity of the submitter (e.g., the developer) and further verify that the specified submitter has the authority and/or reputation level necessary to submit proposed blocks to the working distributed ledger and/or the primary distributed ledger. If the PoA validation fails (e.g., the proposed block is submitted by a non-developer), the proposed block may be rejected, thereby preventing the addition of the proposed block to the working distributed ledger.

If the PoA validation succeeds, the process may continue to block 406, where the system appends the proposed block to the working distributed ledger. At this stage, the working distributed ledger contains a copy of the primary source code plus the commits made by the developer. Accordingly, the working distributed ledger may contain changes that are ready to be merged into the main branch (e.g., the primary source code).

The process continues to block 407, where the system submits the proposed block to the primary distributed ledger. Before the commits of the proposed block are allowed to be merged into the primary source code, the system may once again perform one or more checks to ensure that the commits refer to the latest version of the source code and that the submitter has the proper authority to submit proposed blocks (e.g., perform PoA validation). Once the SCCC and PoA validation have been successfully completed, the system may move forward with merging the commits into the primary source code.

The process continues to block 408, where the system validates the proposed block via a second consensus algorithm. In some embodiments, the second consensus algorithm may be a PoW algorithm which requires that the computing system of the submitter of the proposed block (e.g., the developer computing system) solves a cryptographic challenge in order to validate the proposed block. In this regard, the developer computing system may calculate an appropriate nonce value to solve the cryptographic challenge, as described elsewhere herein. Once the nonce value has been calculated, the system may determine that the proposed block is valid.

The process concludes at block 409, where the system appends the proposed block to the primary distributed ledger. At this stage, the commits submitted by the developer will have been merged into the primary source code; shortly thereafter, the latest version of the primary blockchain may be propagated to all of the nodes of the primary distributed ledger, including production systems. Accordingly, other currently existing working copies that do not reflect the addition of said proposed block may be considered out of date, which may cause such copies to fail the SCCC. Upon detecting an SCCC failure, the system may generate a new working copy of the source code based on the latest version of the source code as found in the primary distributed ledger. In this way, the computer code may be kept consistently up to date across all related computing systems within the enterprise environment.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for electronic integration and deployment of computer code in a code development network, the system comprising:
    a memory device with computer-readable program code stored thereon;
    a communication device; and
    a processing device operatively coupled to the memory device and the communication device, wherein the processing device is configured to execute the computer-readable program code to:
        retrieve, from a primary distributed ledger, a latest version of computer code;
        generate, from the latest version of the computer code, a working distributed ledger comprising a working genesis block, wherein the working genesis block is a copy of a latest block within the primary distributed ledger at a first point in time, wherein the working genesis block is a first block within the working distributed ledger;
        submit a proposed block to the working distributed ledger, wherein the proposed block comprises one or more commits to the computer code;
        repeatedly execute, at designated time intervals, a computer code conflict check by comparing the primary distributed ledger with the working distributed ledger, wherein the computer code conflict check comprises:
            retrieving a nonce value from the latest block within the primary distributed ledger at the first point in time; and
            combining the nonce value with a block header of the working genesis block within the working distributed ledger into a hash algorithm to generate a hash output; and
        validate the proposed block via a consensus algorithm.

2. The system according to claim 1, wherein the processing device is further configured to:
    submit the proposed block to the primary distributed ledger;
    execute a second computer code conflict check;
    validate the proposed block via the consensus algorithm; and
    validate the proposed block via a second consensus algorithm.

3. The system according to claim 1, wherein the computer code conflict check further causes the processing device to:
    detect that the nonce value is below a predetermined threshold;
    based on detecting that the nonce value is below the predetermined threshold, determine that a cryptographic challenge has been satisfied; and
    determine that the computer code conflict check has been successfully completed.

4. The system according to claim 1, wherein the computer code conflict check further causes the processing device to:
    detect that the nonce value is above a predetermined threshold;
    based on detecting that the nonce value is above the predetermined threshold, determine that a cryptographic challenge has not been satisfied; and
    determine that the computer code conflict check has failed.

5. The system according to claim 1, wherein the processing device is further configured to:
    detect that the computer code conflict check has been successfully completed; and
    based on detecting that the computer code conflict check has been successfully completed, determine that the working distributed ledger is up to date.

6. The system according to claim 1, wherein the processing device is further configured to:
    detect that the computer code conflict check has failed;
    retrieve, from the primary distributed ledger, a refreshed version of the computer code; and
    generate, from the refreshed version of the computer code, a working distributed ledger comprising a refreshed genesis block, wherein the refreshed genesis block is a copy of a last block within the primary distributed ledger at a second point in time, wherein the second point in time occurs after the first point in time.

7. The system according to claim 3, wherein the processing device is further configured to generate and transmit a notification to a developer, wherein the notification indicates that the working distributed ledger needs to be refreshed.

8. The system according to claim 2, wherein the consensus algorithm is a proof of authority algorithm, wherein the second consensus algorithm is a proof of work algorithm.

9. The system according to claim 1, wherein the processing device is further configured to:
    detect that the proposed block has been successfully validated via the consensus algorithm; and append the proposed block to the working distributed ledger.

10. The system according to claim 8, wherein the processing device is further configured to:
   detect that the proposed block has been successfully validated via the consensus algorithm and the second consensus algorithm; and
   append the proposed block to the primary distributed ledger.

11. A computer program product for electronic integration and deployment of computer code in a code development network, the computer program product comprising at least one non-transitory computer readable medium having computer-readable program code portions embodied therein, the computer-readable program code portions comprising executable code portions for:
   retrieving, from a primary distributed ledger, a latest version of computer code;
   generating, from the latest version of the computer code, a working distributed ledger comprising a working genesis block, wherein the working genesis block is a copy of a latest block within the primary distributed ledger at a first point in time, wherein the working genesis block is a first block within the working distributed ledger;
   submitting a proposed block to the working distributed ledger, wherein the proposed block comprises one or more commits to the computer code;
   repeatedly executing, at designated time intervals, a computer code conflict check by comparing the primary distributed ledger with the working distributed ledger, wherein the computer code conflict check comprises:
      retrieving a nonce value from the latest block within the primary distributed ledger at the first point in time; and
      combining the nonce value with a block header of the working genesis block within the working distributed ledger into a hash algorithm to generate a hash output; and
   validating the proposed block via a consensus algorithm.

12. The computer program product according to claim 11, wherein the computer-readable program code portions further comprise executable code portions for:
   submitting the proposed block to the primary distributed ledger;
   executing a second computer code conflict check;
   validating the proposed block via the consensus algorithm; and
   validating the proposed block via a second consensus algorithm.

13. The computer program product according to claim 11, wherein the computer code conflict check further comprises:
   detecting that the nonce value is below a predetermined threshold;
   based on detecting that the nonce value is below the predetermined threshold, determining that a cryptographic challenge has been satisfied; and
   determining that the computer code conflict check has been successfully completed.

14. A computer-implemented method for electronic integration and deployment of computer code in a code development network, the method comprising:
   retrieving, from a primary distributed ledger, a latest version of computer code;
   generating, from the latest version of the computer code, a working distributed ledger comprising a working genesis block, wherein the working genesis block is a copy of a latest block within the primary distributed ledger at a first point in time, wherein the working genesis block is a first block within the working distributed ledger;
   submitting a proposed block to the working distributed ledger, wherein the proposed block comprises one or more commits to the computer code;
   repeatedly executing, at designated time intervals, a computer code conflict check by comparing the primary distributed ledger with the working distributed ledger, wherein the computer code conflict check comprises:
      retrieving a nonce value from the latest block within the primary distributed ledger at the first point in time; and
      combining the nonce value with a block header of the working genesis block within the working distributed ledger into a hash algorithm to generate a hash output; and
   validating the proposed block via a consensus algorithm.

15. The computer-implemented method of claim 14, the method further comprising:
   submitting the proposed block to the primary distributed ledger;
   executing a second computer code conflict check;
   validating the proposed block via the consensus algorithm; and
   validating the proposed block via a second consensus algorithm.

16. The computer-implemented method of claim 14, wherein the computer code conflict check further comprises:
   detecting that the nonce value is below a predetermined threshold;
   based on detecting that the nonce value is below the predetermined threshold, determining that a cryptographic challenge has been satisfied; and
   determining that the computer code conflict check has been successfully completed.

17. The computer-implemented method of claim 14, wherein the computer code conflict check further comprises:
   detecting that the nonce value is above a predetermined threshold;
   based on detecting that the nonce value is above the predetermined threshold, determining that a cryptographic challenge has not been satisfied; and
   determining that the computer code conflict check has failed.

* * * * *